United States Patent [19]

Valiant, II

[11] 3,959,505

[45] May 25, 1976

[54] METHOD FOR PROCESSING FOOD PRODUCTS

[76] Inventor: Joseph W. Valiant, II, R.F.D. 1, Box 48, Goode, Va. 24556

[22] Filed: Dec. 23, 1974

[21] Appl. No.: 535,747

[52] U.S. Cl. .............................. 426/393; 426/407; 426/414; 426/513; 426/518
[51] Int. Cl.² ................................................ A23B 4/06
[58] Field of Search .......... 426/393, 407, 410, 412, 426/413, 414, 513, 518

[56] References Cited
UNITED STATES PATENTS

| | | | |
|---|---|---|---|
| 2,110,801 | 3/1938 | Hopkinson | 426/393 |
| 3,316,104 | 4/1967 | Lugiewicz | 426/413 X |
| 3,542,570 | 11/1970 | Bush et al. | 426/413 |
| 3,638,554 | 2/1972 | Ackroyd | 426/407 |

Primary Examiner—Frank W. Lutter
Assistant Examiner—William Cuchlinski, Jr.
Attorney, Agent, or Firm—A. Yates Dowell, Jr.

[57] ABSTRACT

The method for processing food products in which the products are initially prepared in a first location where they are treated and a specific quantity of products are formed to a particular size and shape and are packed in containers after which the product is frozen and shipped to a second location where the product is removed from the container and precise segments are placed in cans with an additive, sterilized and prepared for sale in commercial markets.

3 Claims, 8 Drawing Figures

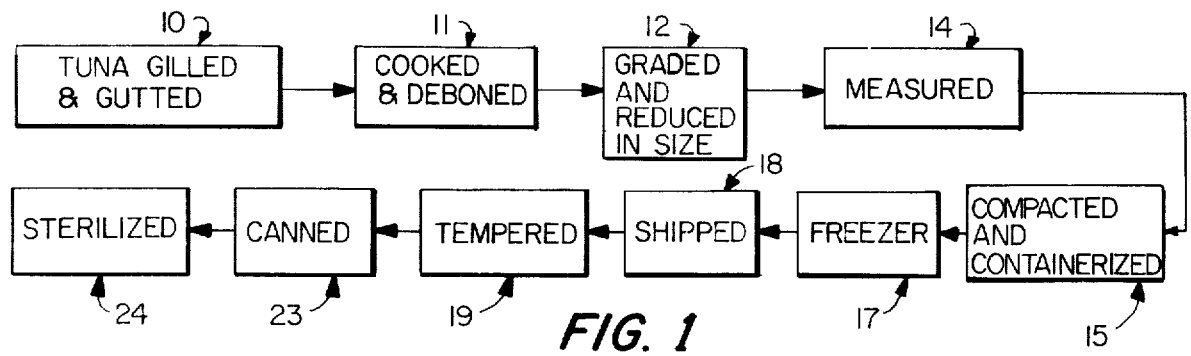
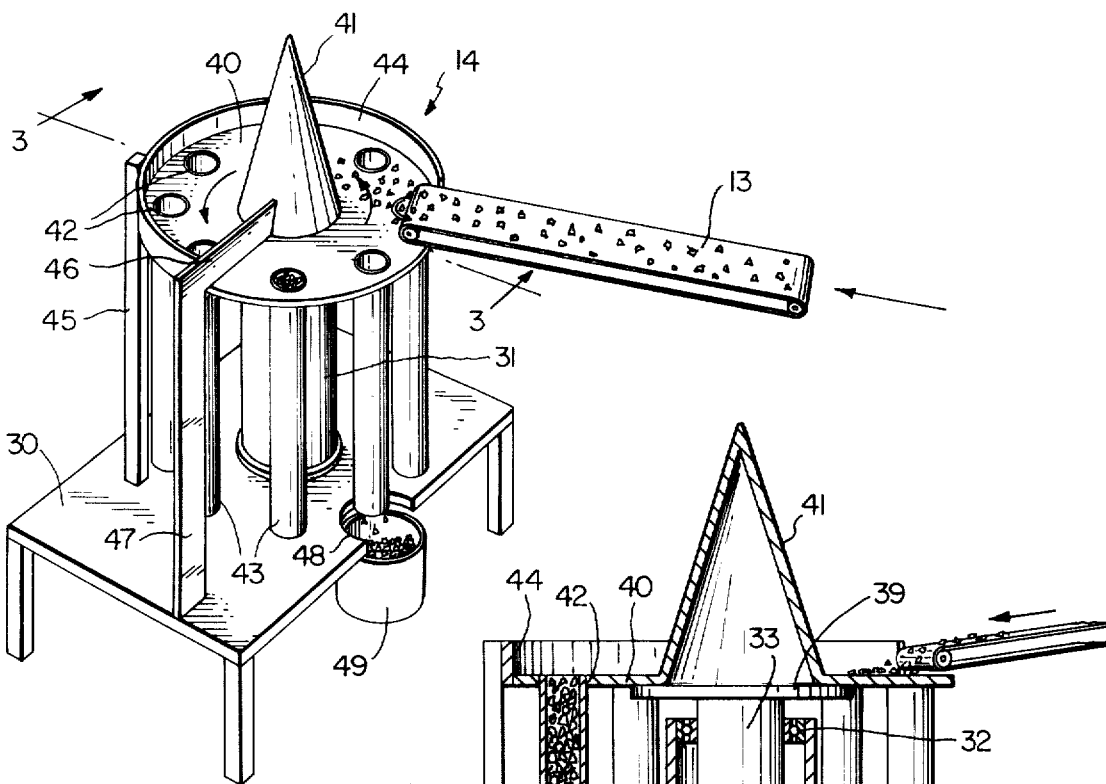
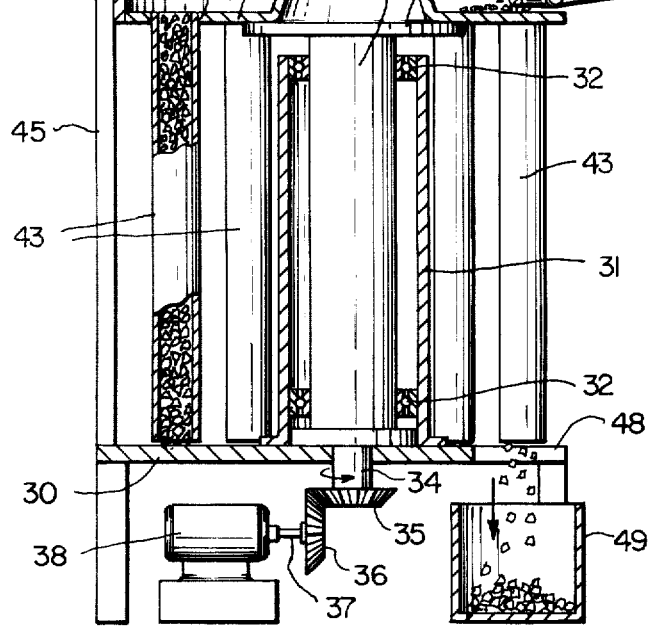

METHOD FOR PROCESSING FOOD PRODUCTS

BACKGROUND OF THE INVENTION

1. Field of the Invention

This invention relates generally to preparation of food products for human consumption and relates particularly to the method and apparatus for partially preparing the food product in one location and completing the preparation in another location.

2. Description of the Prior Art

Heretofore food products such as meat, fowl and seafoods of various kinds have been cooked, deboned, placed in cans and sterilized using many methods which produce an end product substantially free from bacteria and palatable for human consumption. Most of the meat and fowl packing plants have been located in the same general vicinity as a slaughterhouse so that the process was carried out in essentially the same location from which the canned food product was shipped to the commercial markets. However, the seafood industry, and particularly the tuna industry, have captured the fish or raw product in an area substantially removed from the packing plant and therefore it has been necessary to store the fish in low temperature brine where it slowly freezes or add ice to the fish or blast freeze the fish to retard spoilage until the ships returned to their home port where the processing and canning has been done. Due to the long period of time between the actual catching of the fish and the processing thereof, a substantial portion has been unacceptable for human consumption due to spoilage, particularly when the fish have not been frozen immediately but have merely been placed into the hold of the ship until the hold was filled. The U.S. Government as represented by the Food and Drug Administration, has set rigid standards on the size, color, density and bacterial count of the fish which has further limited the number of acceptable fish delivered to the packing plants.

After the fish are delivered and accepted, some of such fish are retained in a frozen condition to be processed while the fishing fleet is at sea. Eventually all of the fish is thawed and then gilled and gutted by removing the head, tail, fins and internal organs of the fish after which the edible portions are steam cooked, deboned and canned with a known quantity of oil and broth and after the cans are sealed such cans are placed within a pressure retort where the temperature is raised to sterilize the contents of the cans. It has been determined that the mercury content of tuna fish varies with the size and variety and, therefore, it has been a common practice to blend the varieties to obtain a constant level of mercury.

In some cases, the fish are filleted at sea and only the loins are frozen so that the ships can stay out longer and bring in a higher quality product. However, filleted fish have greater surface area exposure per pound of fish so that dehydration by transpiration or leaching out of moisture has been a substantial problem. In an effort to reduce the problem, an anti-oxidant or glaze has been applied to the loins and such loins have been placed within film or other packages. However, the loins normally must be completely thawed before the covering material can be removed.

With regard to the tuna industry, four grades of tuna are acceptable, including solid pack which is solid pieces of prime loin of the tuna compressed together and usually packed with approximately 15% vegetable oil and broth or water; chunk light tuna in which at least 50% of the pieces are retained on a one-half inch screen and normally packed with approximately 15% vegetable oil and broth or water; flaked tuna which includes relatively small thin flakes which are compressed together and packed with oil, broth or water; and grated tuna which includes fine pieces packed with oil or water. Due to the fragile nature of the tuna, such tuna has been easily broken during handling so that excessive handling frequently results in tuna of a lower grade. Approximately 60% to 65% of the canned tuna sales in the United States are for chunk light tuna in oil.

In order to protect the highly labor oriented tuna industry in this country, a 35% duty has been placed on imported tuna which has been processed and packed in oil; a 6% duty has been placed on tuna which has been processed and packed in water; and little or no duty has been placed on raw fish or fish which has been processed but not packed in cans or other airtight containers.

With the progress in the tuna industry, the disposal of the unusable portions of the tuna has become a substantial problem due to U.S. Government controls as represented by the Environmental Protection Agency. Many efforts have been made to utilize the waste material, such as the production of fish fertilizer, fish meal, fish oil and the like; however, additional environmental problems such as obnoxious odors and an oily dirty waste effluent have accompanied the preparation of such byproducts. Therefore the disposal of the waste portions of the tuna has remained an increasing environmental problem.

Some examples of the prior art are the U.S. Pats., to Taylor, No. 1,864,285; Hopkinson, No. 2,110,801; Carruthers, No. 2,575,703; Lapeyre, No. 3,594,191; and Vogel, No. 3,677,775.

SUMMARY OF THE INVENTION

The present invention is embodied in a method and apparatus for processing food products and particularly tuna fish by initially processing the food product at a first installation located in a remote area where the disposal of unused portions is not a severe environmental problem. At the first installation the tuna or other food product is gilled, gutted, cooked, deboned and graded as to size and color. Thereafter the proper grade is selected and is broken, diced, cubed or otherwise reduced in size and blended with pieces of other varieties of tuna fish, and a fixed quantity is measured and placed in a stuffer or packaging machine having a packing chamber of predetermined size or volume which compacts the product into an elongated generally cylindrical column of a commercially acceptable uniformity and density and which is substantially devoid of air spaces. The packaging machine immobilizes the fragile chunks of tuna relative to each other so that breakage is minimized or eliminated. The product is then placed in a durable moisture-proof cylindrical container of a predetermined size and sealed without water or other liquid being added thereto. After the cylinders have been sealed, the tuna or other food product is frozen to a temperature of approximately 0° F. to cause any bacterial action to become dormant. The cylindrical columns of relatively small diameter are quickly and easily frozen and the shape permits maximum use of storage facilities which are expensive to construct and operate, normally requiring less than half the storage space required by raw fish.

The durable containers are shipped to a second installation such as a cannery while the 0° temperature is maintained. At the cannery the cylinders of tuna may be maintained in frozen condition as long as desired and then are subjected to a tempering operation by slowly raising the temperature or by alternate cycles of heating with dwell cycles or equilibration cycles until the temperature of the product is raised to a uniform temperature of approximately 22° to 25° F. The containers are removed from the product and the cylindrical product is sliced into precise segments which are placed into cans with a predetermined quantity of oil and broth after which the cans are sealed and the product is sterilized in a conventional manner preparatory to shipping to commercial markets.

It is an object of the invention to provide a coordinated process for treating food products in which the initial steps are carried out in remote areas where the disposal of unused portions is not a severe environmental problem and such products are packed into containers of a specific size and frozen for shipment to a second installation or cannery where the products are processed for shipment to commercial markets.

Another object of the invention is to provide apparatus for immobilizing predetermined quantities of a product and placing such product in a durable, moisture-proof, tight fitting container in a manner that the product can be quickly frozen and thereafter shipped to a cannery where the product is sliced into precise segments and placed in cans in the presence of additives and the cans are sealed and prepared for shipment to commercial markets.

BRIEF DESCRIPTION OF THE DRAWINGS

FIG. 1 is a block diagram illustrating the process of the present invention.

FIG. 2 is a perspective of the apparatus for measuring precise quantities of the product.

FIG. 3 is an enlarged section on the line 3—3 of FIG. 2.

DESCRIPTION OF THE PREFERRED EMBODIMENT

Figure 4:
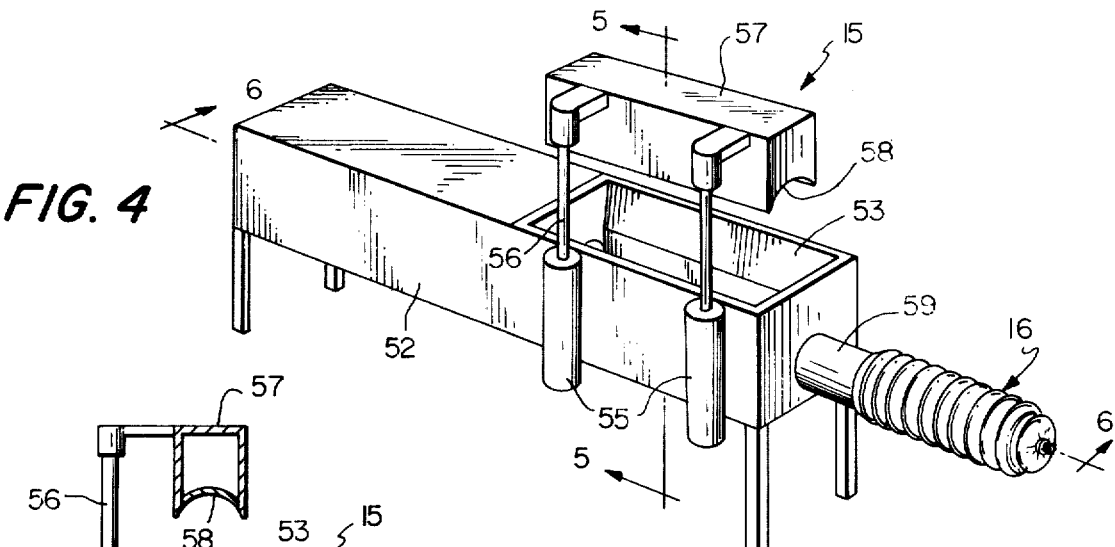
FIG. 4 is a perspective of a packaging apparatus which compacts the product into a cylinder and places the cylinder in an elongated container.
Figure 5:
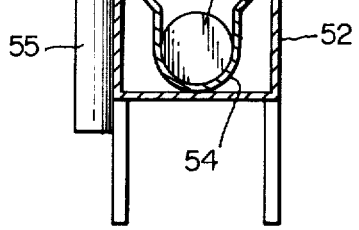
FIG. 5 is an enlarged section on the line 5—5 of FIG. 4.
Figure 6:
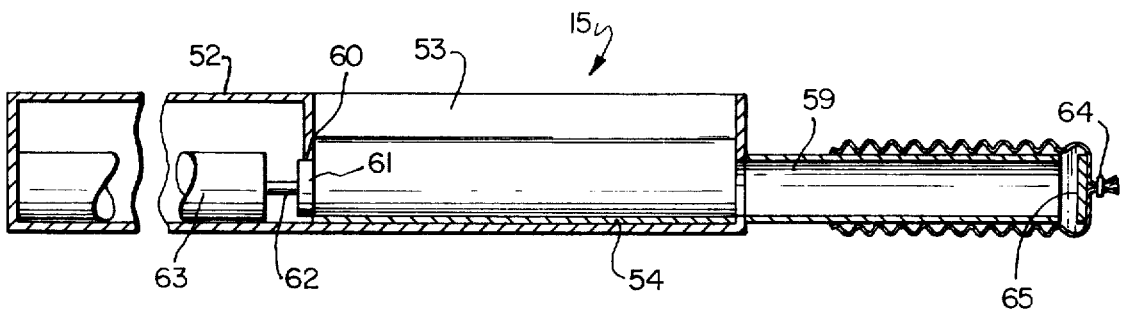
FIG. 6 is an enlarged fragmentary section on the line 6—6 of FIG. 4.
Figure 7:
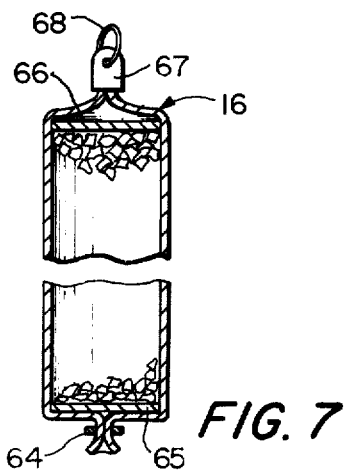
FIG. 7 is a fragmentary section of a container ready for shipping.
Figure 8:
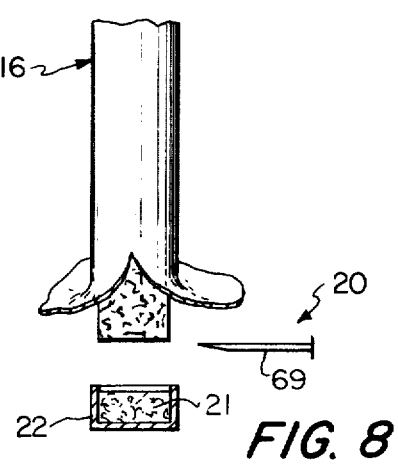
FIG. 8 is a schematic side elevation of the apparatus for slicing the product.

With continued reference to the drawings, tuna fish or other sea food or food product is normally caught or captured in an area remote from a cannery or food processing plant. In particular, tuna fish thrive in the North Atlantic and North Pacific, South Pacific and Indian Oceans and along the Western Coasts of North and South America, and in other areas remote from the jurisdiction of the Environmental Protection Agency of the U.S. Government. In areas remote from the cannery or processing plant, a factory ship or other first processing installation may accompany the fishing fleet or such installation may be located on a remote island or remote section of the United States or its territories which is easily accessible to the fishing fleet.

At the first processing installation, the unusable portions 10 of the tuna, such as the head, tail, fins and internal organs, are removed and disposed of in any desired manner, as by converting into fish meal or by dumping at sea which provides food for local fish and other marine life. The usable portions of the tuna are cooked, chilled and deboned, as indicated at 11, after which the different sizes and grades of tuna are separated and the tuna of a grade suitable for "chunk light tuna" is blended and then broken, diced or cubed in a manner that at least 50% of the tuna is retained on a ½ inch mesh screen, as indicated at 12. The pieces of tuna are carried in any desired manner, as by a conveyor 13 to a measuring apparatus 14 where a measured volume or quantity of the tuna is separated from the remainder. Since a known quantity of tuna is of a substantially constant weight, it is considered that the tuna is separated by weight and volume.

The measured quantity of tuna is discharged into a packaging apparatus 15 for compacting or compressing the pieces or chunks of tuna into a substantially solid column or cylindrical mass which is practically devoid of air spaces without breaking the fragile chunks. The column is of approximately the same diameter as the diameter of the cans into which the tuna eventually will be placed. Within the solid column, the tuna chunks are immobilized relative to each other and are moved as a unit by the packaging apparatus into a durable moisture-proof casing or container 16 which is then sealed. Although the column of tuna can be of any desired size, a cylindrical mass having a diameter of approximately 2¾ inches and a length of approximately 60 inches has been found satisfactory. Thereafter the container is placed in a freezer 17 where the column of tuna is quick frozen to a temperature of approximately 0° F. and is stored until shipped. Due to the small diameter of the column, the tuna is completely frozen in a short period of time to inhibit bacterial growth.

When a desired number of columns of tuna have been frozen, such columns are transferred to a ship, truck or other mode of transportation 18 in which a temperature of 0° F. is maintained until the columns are delivered to a second installation or cannery. At the cannery the columns of tuna are stored until they are to be prepared for canning at which time the columns are tempered, as indicated at 19, by subjecting the columns to alternating heat and dwell or equilibration cycles until the temperature of the column in the container has been raised uniformly to approximately 22° to 25° F. to prevent shattering or breaking of the chunks of tuna when the column is sliced into precise segments. After the column has been tempered, the container 16 is removed from the column or cylindrical mass and the column is placed in a slicing apparatus 20 which cuts the column into precise segments 21. The individual segments are placed in a can 22 and approximately 15% by weight of oil and broth or water are added to the contents of the can after which a lid is placed on the can and sealed, as indicated at 23.

Thereafter the cans of tuna and liquid are placed in a conventional pressure retort where the temperature is raised rapidly and held at an elevated temperature for the length of time necessary to destroy bacteria and sterilize the food product within the can, as indicated at 24. After sterilization, the tuna or other food product is ready to be shipped to market without refrigeration.

In order to carry out this process, after the tuna has been cooked, graded, blended and reduced in size, it is delivered by the conveyor 13 to the measuring apparatus 14 which includes a base 30 having an upright central column or sleeve 31 with bearings 32 adapted to rotatably support a post 33 within the column 31. The lower end of the post 33 is provided with a shaft 34 on which a driven gear 35 is fixed. The driven gear 35 meshes with a drive gear 36 carried by a shaft 37 of a power plant 38. Such power plant preferably has a variable drive or, if desired, a speed reducer (not shown) could be interposed between the power plant and the drive gear and such power plant could be operated intermittently or continuously for a purpose which will be described later.

The upper end of the post 33 is provided with a support member 39 having a flat generally horizontally disposed cylindrical disk or plate 40 mounted thereon. The disk 40 has an upstanding cone 41 located generally centrally thereof and a plurality of openings 42 having centers located along a circle between the cone 41 and the periphery of the disk 40. Each of the openings receives a downwardly extending tube 43 which is open at both ends and such tubes are of a diameter and length to receive a predetermined quantity of material. A fixed retainer 44 supported by uprights or stanchions 45 is located closely adjacent to the major portion of the periphery of the disk 40 to prevent the discharge of tuna or other product from such disk. The cone 41 keeps the tuna in the area of the disk between the cone and the retainer 44 so that the tuna falls by gravity into the tubes 43.

Preferably one or more operators are stationed adjacent to the measuring apparatus and such operators use paddles or other generally flat tools to guide the chunks of tuna into the tubes 43. A levelling member or scraper 46 carried by an upright 47 extends across and closely adjacent to the disk 40 and the inner edge of such scraper is located closely adjacent to the cone 41 so that tuna remaining on the disk 40 cannot pass beyond the scraper 46. The lower ends of the tubes 43 terminate closely adjacent to the upper surface of the base 30 so that the tuna or other product is not discharged from the tubes during most of the rotation of the disk 40. The base 30 is provided with a cutout or opening 48 located below the path of the tubes 43 so that the tuna can be discharged from one tube at a time.

As illustrated in FIGS. 2 and 3, a receptacle 49 is disposed below the opening 48 for receiving the contents of a tube and such receptacle is movable so that the material discharged thereinto can be placed within the packaging apparatus 15. It is noted that instead of a receptacle 49, the measuring apparatus 14 could be located above the packaging apparatus 15 and connected thereto by a chute or the like so that material from the tubes 43 is discharged directly into the packaging apparatus 15. In this case the operation of the packaging apparatus is in timed relationship with or is controlled by the operation of the measuring apparatus.

The packaging apparatus 15 includes an elongated housing 52 having a hopper 53 at one end with a semi-cylindrical bottom wall 54 of a fixed radius into which a charge of tuna or other product is received and is spread substantially evenly throughout the length of the hopper. One or more fluid cylinders 55 is mounted in a vertical direction along one side of the housing 52 adjacent to the hopper 53 and each of such cylinders has a piston rod 56 movably mounted therein. The upper ends of the piston rods are connected to a press 57 having a semi-cylindrical bottom wall 58 which cooperates with the semi-cylindrical wall 54 to form a hollow cylinder at the bottom of the hopper 53 when the press 57 is lowered by the cylinders 55.

One end of the hopper 53 communicates with a tubular nozzle or horn 59 which is open at both ends and is of a length substantially equal to the length of the hopper 53. The opposite end of such hopper is provided with an opening 60 within which a piston 61 is snugly received. The inner face of the piston 61 is substantially flush with the end of the hopper 53 when the piston is in retracted position. The piston 61 is connected to a piston rod 62 carried by a horizontally disposed elongated fluid cylinder 63 mounted within the housing 52 so that after the press 57 has compacted the tuna or other material within the hopper into a substantially solid column, the fluid cylinder 63 is operated to cause the piston 61 to push the column of tuna into the horn 59.

Before the fluid cylinder 63 is operated again, a first container 16 is folded in a manner similar to a bellows or an accordian and is placed on the exterior of the horn 59 after one end of the container has been sealed by a clip 64 and a flat disk or plug 65 has been placed within the container adjacent to the clip 64. The container 16 is constructed of a strong durable waterproof fibrous paper or other flexible material which is capable of withstanding the expansion of the material caused by freezing as well as to substantially prevent the passage of moisture therethrough to control the transpiration or sublimation of moisture from the product while the product is frozen and to function as a barrier to bacteria.

In subsequent operations, a pair of flat disks or plugs 65 and 66 are located adjacent to the inner end of the column within the horn to separate the charges. The disk 66 adjacent to the horn is discharged with the column in the horn to form an upper plug and the other disk 65 forms the bottom of the next column. When the container 16 is in place on the horn 59, and another column has been formed, the fluid cylinder 63 is operated so that the piston 61 pushes the second column of material out of the hopper and into the horn while the second column pushes the first column through the horn and into the container 16 which unfolds or expands lengthwise as the first column of material is being discharged thereinto. If desired a semi-cylindrical trough (not shown) may be provided adjacent to the discharge end of the horn 59 to support the column of material and the container as the column is being discharged from the horn. Since the piston 61 and the horn 59 are substantially the same diameter as the column of tuna or other food product, little or no relative movement of the compressed chunks of tuna occurs while the column of tuna is being inserted into a container. It is noted that when the packaging apparatus is operating in timed relationship with the measuring apparatus 14, the return of the piston 61 to a retracted position causes the power plant 38 to operate and rotate the disk 40 so that another charge of tuna is dispensed from one of the tubes 43.

After the column of tuna has been placed within the container, the open end of the container 16 is closed and crimped by a clip 67 having a hook or ring 68 so that the column of tuna and container can be suspended with the axis of the column in a generally vertical plane. In this position, the container is moved into a freezer which quickly freezes the column of tuna to a temperature of approximately 0° F. to arrest any bacterial action.

After a number of containers of tuna or other food product have been prepared, such containers are shipped to a second installation or cannery while the 0° F. temperature is maintained. If the containers are being shipped from an installation outside of the United States, little or no duty is assessed since the tuna contains no external water or other liquid.

At the cannery the containers with the columns of tuna therein are tempered when desired to maintain a substantially constant canning operation by subjecting the containers to alternating heat and dwell cycles so that the temperature of the tuna is gradually raised to approximately 22° to 25° F. which temperature extends entirely through the column of material. When the column of material has been tempered, either the container 16 is entirely removed from the column and the column is placed within the slicing apparatus 20, or one end of the container is opened and the container is slit and removed from the column as the column passes through the slicing apparatus 20. Within the slicing apparatus a knife or other cutting member 69 slices the column of material into segments 21 of predetermined length and each of such segments is placed within a can 22 together with a required amount of oil and broth or water. Thereafter the cans are sealed and sterilized in a conventional manner. The tempering of the column of material permits the slicing apparatus 20 to cut segments of a precise length without shattering or breaking the chunks of tuna. Ideally the columns of tuna are of a length to provide a predetermined number of segments with little or no overage.

In the operation of the device, tuna or other food product is initially processed at a first installation where unusable portions are removed and disposed of in a convenient manner while the usable portions are cooked and graded. When the food product is tuna fish which is to be processed as "chunk light tuna," the proper grade of tuna is reduced in size and delivered to the measuring apparatus 14 which measures a specific charge that is then introduced into the packaging apparatus 15. Within the packaging apparatus the charge of tuna is compacted by the press 57 against the semi-cylindrical wall of the hopper 53 without breaking the chunks of tuna to form a substantially solid column in which the chunks are immobilized relative to each other and which has substantially no air pockets or voids therein. The column is moved lengthwise and inserted into a container 16 which is then sealed and moved into a freezer which freezes the material. The process between the cooking and the freezing of the product at the first installation is carried out in a rapid manner so as to reduce bacterial growth to a minimum. The columns of material are frozen to a temperature of approximately 0° F. and are maintained at such temperature during shipping to a second installation such as a cannery where the temperature of the product is raised or tempered to a point where the product can be sliced without breaking or shattering the chunks of tuna. Since the temperature of the tempered product is still below freezing, little bacterial activity occurs while the product is being sliced into precise segments and placed into cans after which oil and broth or water are added and the cans are sealed. Immediately thereafter the cans are placed within a pressure retort and the contents of the cans are sterilized to destroy any bacteria therein.

I claim:

1. The method of preparing and canning tuna fish products comprising the steps of: removing unusable portions from said product at a first installation, cooking the usable portions of the product, measuring a predetermined charge of pieces of said usable portions, equally distributing said charge along a portion of a packaging apparatus, compacting said charge to substantially immobilize said pieces relative to each other and form a substantially solid column having a predetermined diameter without breaking said portions, discharging said column into a container and sealing said container, freezing said column to a temperature sufficient to cause most bacteria to become dormant, shipping said frozen product to a second installation while maintaining the frozen condition of said columns, removing said container from said column, slicing said column into a plurality of segments of predetermined size, placing each segment into a can, sealing said can, and subjecting said can to heat for sterilizing the product within said can.

2. The method of claim 1 including the step of, tempering said product at said second installation before removing said container from said column.

3. The method of claim 1 including the step of adding liquid to the segment in each can before the can is sealed.

* * * * *